United States Patent
Mandai

(10) Patent No.: US 7,403,363 B2
(45) Date of Patent: Jul. 22, 2008

(54) SWITCHING ELEMENT AND PROTECTION CIRCUIT USING THE SAME

(75) Inventor: Tadao Mandai, Gunma (JP)

(73) Assignee: Sanyo Electric Co., Ltd., Moriguchi-shi (JP)

(*) Notice: Subject to any disclaimer, the term of this patent is extended or adjusted under 35 U.S.C. 154(b) by 188 days.

(21) Appl. No.: 11/244,393

(22) Filed: Oct. 6, 2005

(65) Prior Publication Data
US 2006/0076933 A1    Apr. 13, 2006

(30) Foreign Application Priority Data
Oct. 8, 2004    (JP)    ............... 2004-296471

(51) Int. Cl.
*H02H 9/00* (2006.01)
(52) U.S. Cl. ........................................ 361/58
(58) Field of Classification Search ............. 361/58
See application file for complete search history.

(56) References Cited

U.S. PATENT DOCUMENTS 5,682,050 A * 10/1997 Williams .................. 257/368
5,689,209 A * 11/1997 Williams et al. ........... 327/425
5,909,103 A    6/1999 Williams et al.
5,949,218 A    9/1999 Colles et al.

FOREIGN PATENT DOCUMENTS

| CN | 1327276 A | 12/2001 |
| EP | 1160954 A2 | 12/2001 |
| EP | 1160954 A3 | 12/2001 |
| JP | 10-012282 | 1/1998 |
| JP | 2001-351697 | 12/2001 |

OTHER PUBLICATIONS

Extended European Search Report mailed Feb. 24, 2006, directed to counterpart EP Application No. 05022042.5.

* cited by examiner

*Primary Examiner*—Michael J Sherry
*Assistant Examiner*—Lucy Thomas
(74) *Attorney, Agent, or Firm*—Morrison & Foerster LLP

(57) ABSTRACT

Provided is a switching element including: a first switching element primarily used for formation of a two-way current path; and a second switching element that interrupts a parasitic diode at the time when the first switching element is turned off. The second switching element may be of smaller chip size because it assists the operation of the first switching element, thereby contributing miniaturization of the switching element and reduction in an ON resistance. Furthermore, adoption of the switching element to a protection circuit realizes reduction in the size of the protection circuit.

9 Claims, 4 Drawing Sheets

Prior Art

SWITCHING ELEMENT AND PROTECTION CIRCUIT USING THE SAME

BACKGROUND OF THE INVENTION

1. Field of the Invention

The present invention relates to a switching element and a protection circuit using the switching element. More specifically, the present invention relates to a switching element that can switch a current path in two directions and has a reduced chip size, and to a protection circuit using the switching element.

2. Description of the Related Art

As a switching element, a switching element that not only switches a device between ON and OFF but also switches the direction of a current path (the direction in which a current path flows) is also under development, and such a switching element is adopted, for example, to a protection circuit of a secondary battery.

As an example of a conventional two-way switching element, FIG. 4 shows a circuit diagram of a protection circuit for a secondary battery.

A two-way switching element 86 has an overdischarge-prevention switching element 82 connected in series to an overcharge-prevention switching element 83, and a control circuit 84 performs an ON-OFF control.

The control circuit 84 detects the battery voltage and switches the overcharging-prevention switching element 83 off at the time when the detected voltage is higher than the maximum set voltage, thereby preventing a secondary battery 1 from being overcharged. In addition, the control circuit 84 switches the overdischarge-prevention switching element 82 off at the time when the detected voltage is lower than the minimum set voltage, thereby preventing the secondary battery 1 from being overdischarged.

The overdischarge-prevention switching element 82 and the overcharge-prevention switching element 83 have a small internal resistance in their ON states, and are constituted of MOSFETs that can achieve reduced power loss and voltage drop. The MOSFETs have parasitic diodes and, therefore, even when the MOSFETs are in OFF state, a current path can be formed in a desired direction by use of the parasitic diodes.

Therefore, even when the battery voltage becomes higher than the maximum set voltage and thus the MOSFET of the overcharge-prevention switching element 83 is turned off, for instance, the secondary battery 1 can be discharged using the parasitic diodes.

Meanwhile, even when the battery voltage becomes lower than the minimum set voltage and thus the MOSFET of the overdischarge-prevention switching element 82 is turned off, the secondary battery 1 can be charged using the parasitic diodes.

The protection circuit 85 shown in FIG. 4 operates in the manner described above and prevents the secondary battery 1 from being overcharged and overdischarged. This technology is described for instance in Japanese Patent Application Publication No. Hei. 10-12282 (page 7, FIG. 1).

As described above, in the conventional technologies one of switching elements is set to as a overcharge-prevention switching element 83 for preventing the secondary battery from being overcharged, and the other one of the switching elements is set to as a overdischarge-prevention switching element 82 for preventing a secondary battery 1 from being overdischarged, thereby realizing a two-way switching element 86. Such the two-way switching element 86 is obtained by connecting the two switching elements (MOSFETs) of the same size in series, but it prevents miniaturization of size as well as progress in reduction of a manufacturing costs.

SUMMARY OF THE INVENTION

The present invention provides a switching device that includes a first switching element comprising a control terminal, a first power terminal, a second power terminal and a back gate, and a second switching element comprising a control terminal, a first power terminal, a second power terminal and a back gate, wherein the first power terminal of the second switching element is connected with the first power terminal of the first switching element, and the second power terminal of the second switching element is connected with the back gates of the first and second switching elements.

The present invention also provides a protection circuit for a secondary battery that includes a plus terminal and a minus terminal, a switching device comprising a first switching element and a second switching element, each of the switching elements comprising a control terminal, a first power terminal, a second power terminal and a back gate, and a control device controlling the first and second switching elements so that the secondary battery is charged and discharged between the plus and minus terminals, wherein the first switching element is connected with the secondary battery in series between the plus terminal and the minus terminal, the first power terminal of the second switching element is connected with the first power terminal of the first switching element, and the second power terminal of the second switching element is connected with the back gates of the first and second switching elements.

DESCRIPTION OF THE PREFERRED EMBODIMENTS

The embodiments of the present invention will be described in detail with reference to FIGS. 1 to 3.

Figure 1A:
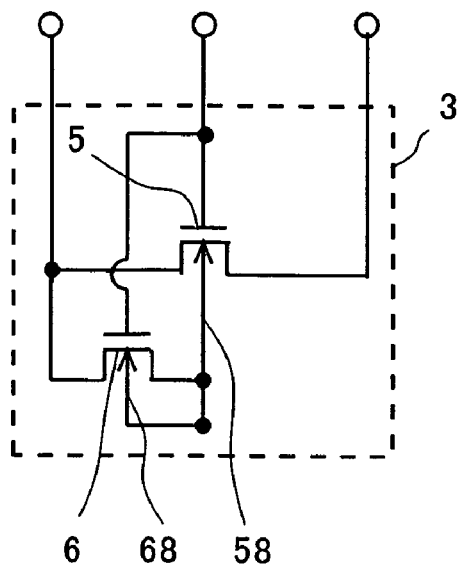
FIG. 1A is a circuit diagram for explaining a switching element of a first embodiment of the present invention.
Figure 1B:
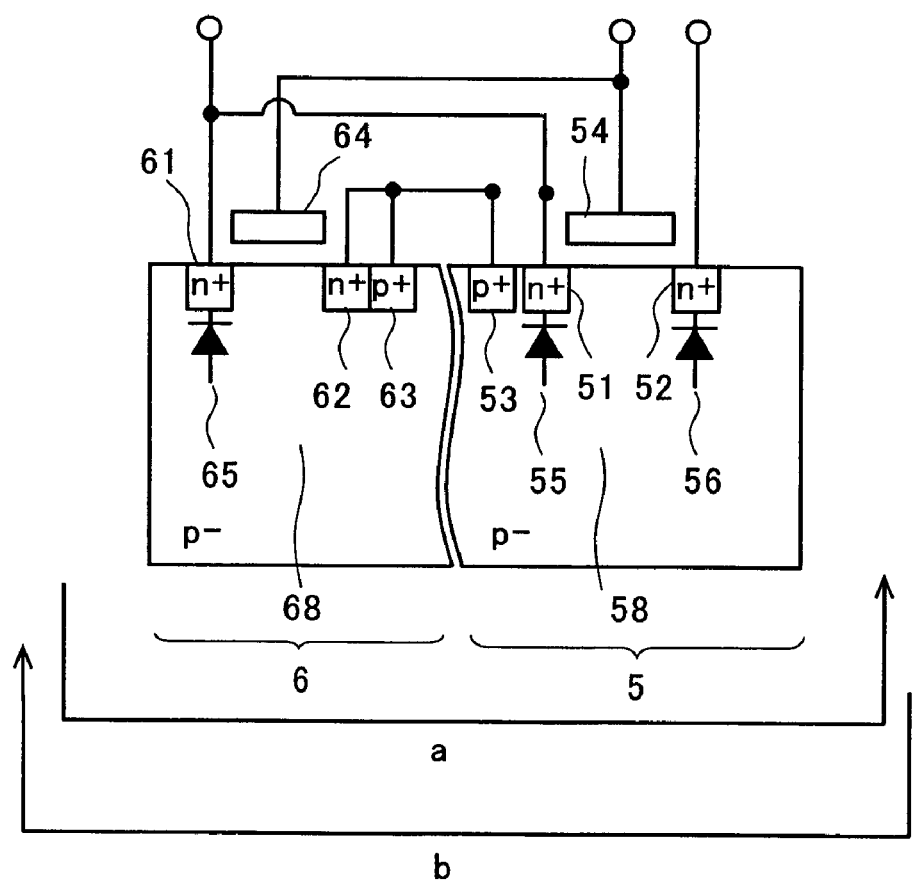
FIG. 1B is a schematic cross section for explaining the switching element of the first embodiment of the present invention.

FIGS. 1A and 1B show a first embodiment of the present invention. FIG. 1A is a circuit diagram of a switching element, and FIG. 1B is a schematic cross section of the switching element.

A switching element 3 of the first embodiment includes a first MOSFET 5 and a second MOSFET 6.

The drain (or source) of the second MOSFET 6 is connected to the drain (or source) of the first MOSFET 5. Additionally, the source (or drain) of the second MOSFET 6 is connected to a back-gate 68 of the second MOSFET 6 and to a back-gate 58 of the first MOSFET 5.

Referring to FIG. 1B, the structure of the switching element 3 will be described. It should be noted that sources are equivalent to drains, and therefore may be replaced by drains in the following descriptions.

The first and second MOSFETs 5 and 6 are, for example, n-channel MOSFETs. In the first MOSFET 5, an n(+)-type source 52 and an n(+)-type drain 51 are provided on a p(−)-type substrate that constitutes the back-gate 58. Furthermore, a p(+)-type back-gate contact 53 is provided on the p(−)-type substrate for the purpose of reducing the contact resistance of the back-gate 58.

The second MOSFET 6 is similar to the first MOSFET 5. In the second MOSFET 6, an n (+)-type source 62 and an n (+)-type drain 61 are provided on a p(−)-type substrate that constitutes the back-gate 68. Furthermore, a p(+)-type back-gate contact 63 is provided on the p(−)-type substrate. The source 62 and the back-gate 68 (back-gate contact 63) are then shorted to each other, and connecting the back-gate 58 (the back-gate contact 53) of the first MOSFET. In addition, the drain 61 of the second MOSFET 6 is connected to the drain 51 of the first MOSFET 5.

In the first MOSFET 5, parasitic diodes 55 and 56 are formed on the substrate depending on the operation state.

Meanwhile, the second MOSFET 6 is at the same potential when the back-gate 68 becomes shorted to the source 62. Thus, only one parasitic diode 65 is formed in the second MOSFET 6.

A gate 54 of the first MOSFET 5 and a gate 64 of the second MOSFET 6 are connected to each other, which means that the same control signal is applied to them. In addition, different potentials are applied to the drain 51 of the first MOSFET 5 (the drain 61 of the second MOSFET 6) and to the source 52 of the first MOSFET 5. Depending on the potential difference to be applied and on signals to be applied to the gates 54 and 64 respectively of the first and second MOSFETs 5 and 6, a current path, formed between the drain 51 of the first MOSFET 5 and the source 52 of the first MOSFET 5, switches between two directions.

Next, a specific description will be provided for the operation of the switching element 3 with reference to the drawings.

At the first place, the switching element 3 is in normal ON state while the gate 54 of the first MOSFET 5 is turned on, and the gate 64 of the second MOSFET 6 is also turned on. Thus, a current flows between the source 52 and drain 51 of the first MOSFET 5 (and between the source 62 and drain 61 of the second MOSFET 6). For example, when the drain 51 of the first MOSFET 5 (the drain 61 of the second MOSFET 6) has high potential (H) whereas the source 52 of the first MOSFET 5 has low potential (L), a current flows in the direction of an arrow "a" shown in FIG. 1B. Meanwhile, when the potential relationship between the drain 51 and the source 52 is reverse, a current flows in the direction of an arrow "b". Thus, the turning on of the first MOSFET 5 allows a current to flow in two directions, based on a potential difference between the source 52 of the first MOSFET 5 and the drain 51 of the first MOSFET 5 (the drain 61 of the second MOSFET 6). In either case, the second MOSFET 6 applies a predetermined potential to the back-gate 58 of the first MOSFET 5. Thus, it is possible to stabilize the threshold voltage of the first MOSFET 5.

Next, a description will be provided for a case where the first MOSFET 5 is turned off. The first MOSFET 5 has two parasitic diodes 55 and 56 that enable a current to flow in two directions. That is, if a potential is applied to the back-gate 58 in that state, the presence of the parasitic diode conducting a current in the forward direction at that time results in a current flowing in the first MOSFET 5 even when it is turned off. In the first embodiment, however, by turning off the second MOSFET 6 in such a case, the back-gate 58 of the first MOSFET 5 comes to have a floating potential. In this way, the parasitic diode conducting a current in the forward direction is interrupted, thereby turning the first MOSFET 5 completely off.

To be more specific, a current path is never formed when the first MOSFET 5 is in OFF state, regardless of the potential relationship between the source 52 of the first MOSFET 5 and the drain 51 of the first MOSFET 5 (the drain 61 of the second MOSFET 6).

Here, the main switch in the first embodiment is the first MOSFET 5. That is, the first MOSFET 5 is generally in ON state, and a potential applied to both terminals of the first MOSFET 5 (i.e., the source 52 and drain 51 of the first MOSFET 5) is switched between low and high, whereby a two-way current path can be formed. The second MOSFET 6 is a switch for stabilizing the potential of the back-gate 58 of the first MOSFET 5 or turning the first MOSFET 5 completely off. For this reason, there is not much need to consider reduction in the ON resistance of the second MOSFET 6.

Accordingly, the chip size of the second MOSFET 6 can be sufficiently reduced compared to that of the first MOSFET 5. For example, the switching element 3 can be smaller than the conventional two-way switching element 86 in which two MOSFETs of the same chip size are connected in series.

Alternatively, if the chip size of the conventional two-way switching element 86 is intended to be maintained, it is possible to increase the chip size of the first MOSFET 5 and thus to reduce the ON resistance of the switching element 3.

Figure 2:
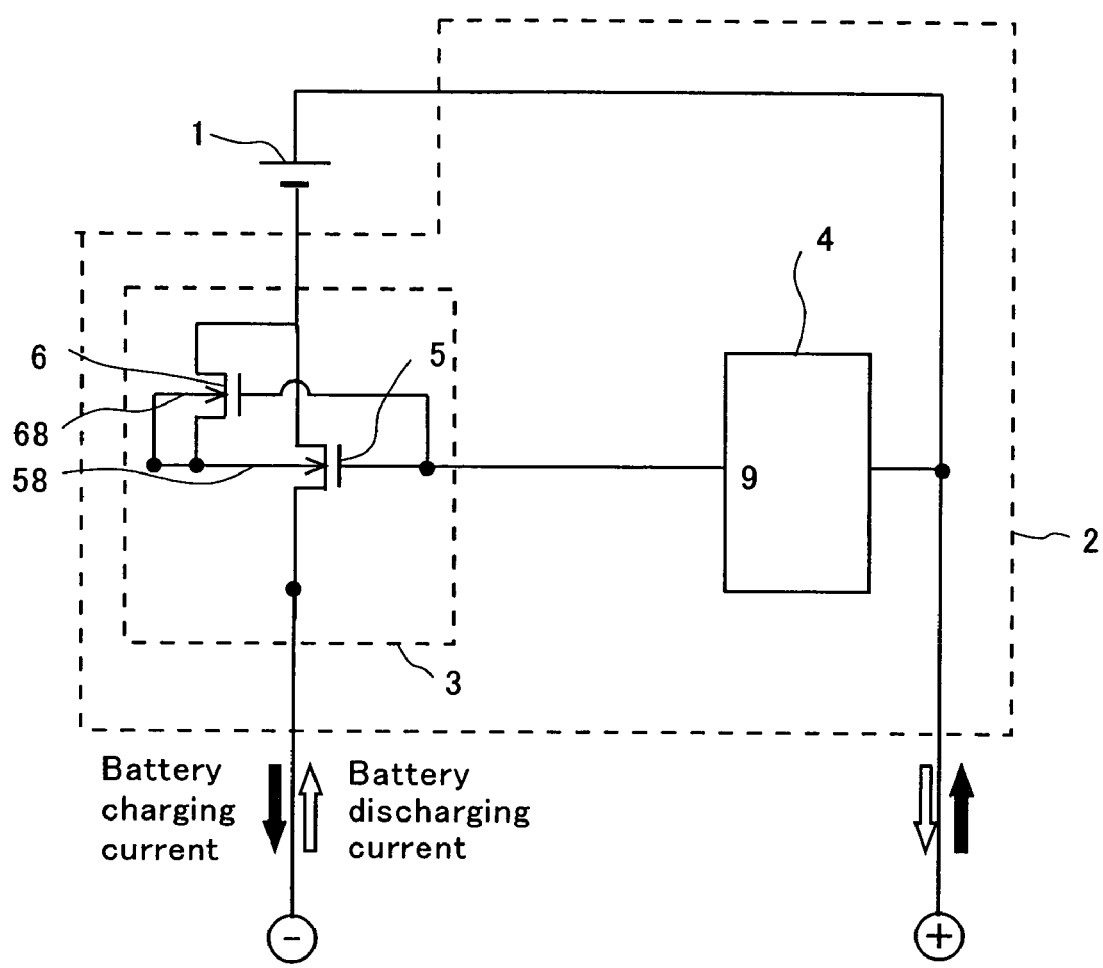
FIG. 2 is a circuit diagram of a protection circuit of a second embodiment of the present invention.
Figure 3:
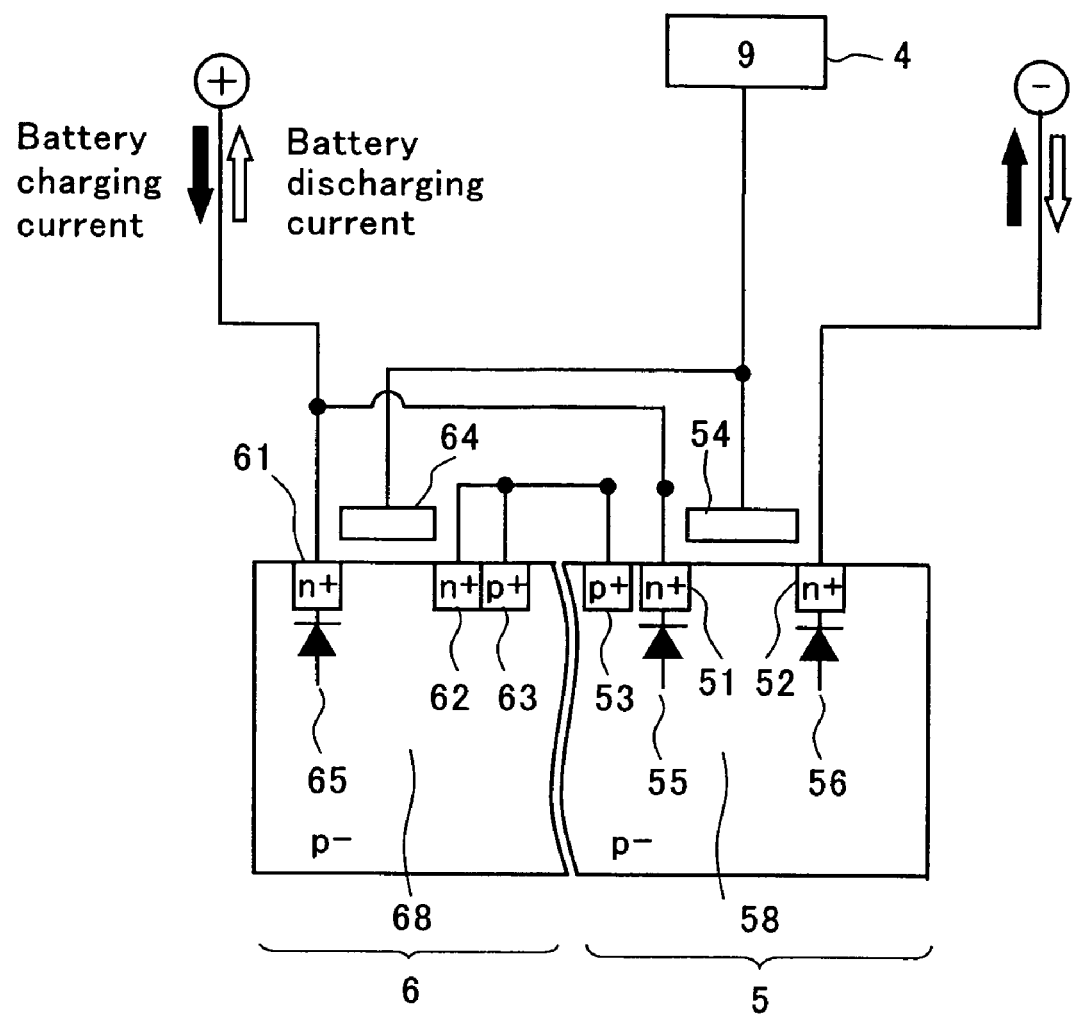
FIG. 3 is a schematic cross section of a protection circuit of the second embodiment of the present invention.
Figure 4:
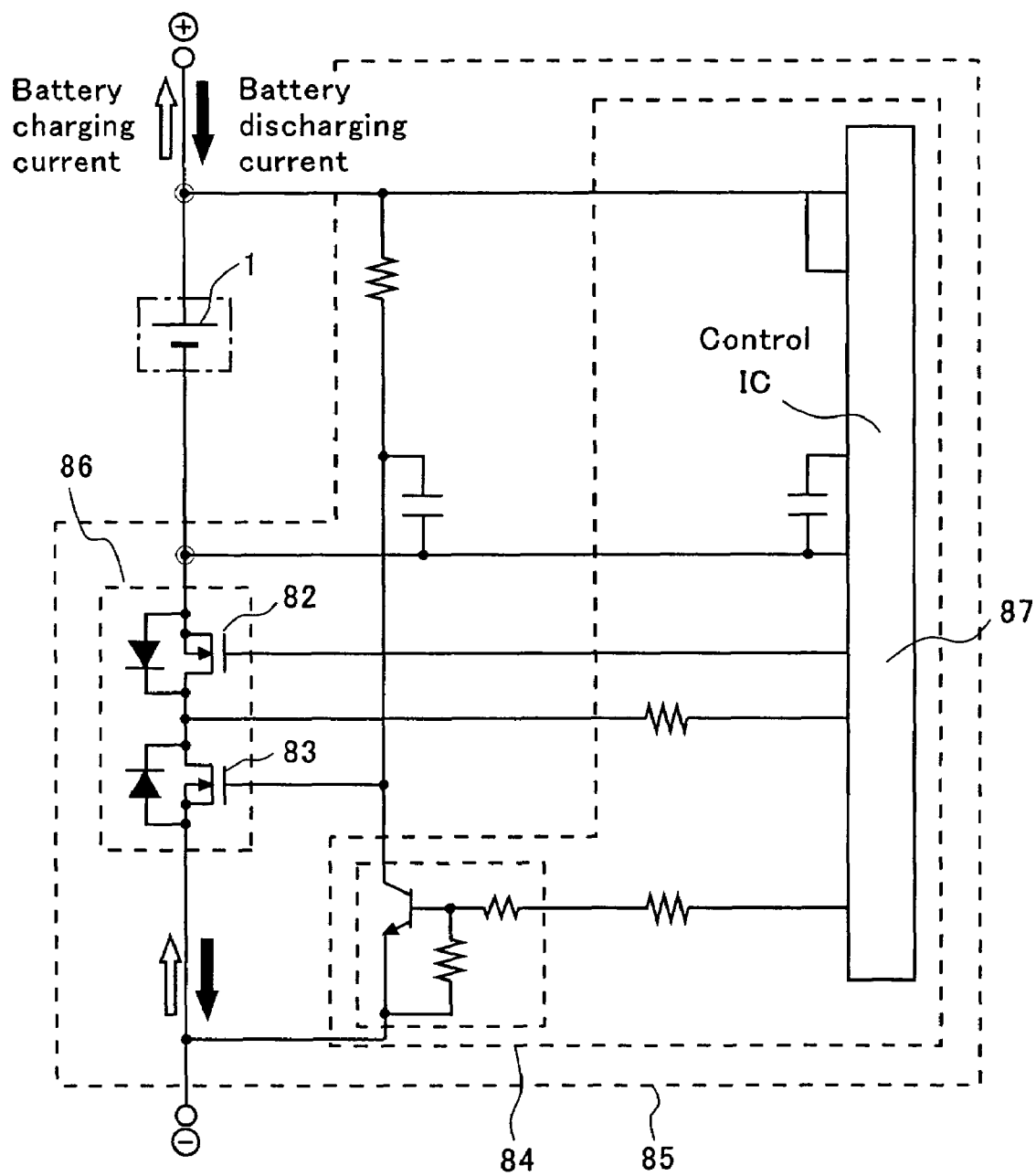
FIG. 4 is a circuit diagram of a conventional protection circuit.

FIGS. 2 and 3 show a second embodiment of the present invention, where the switching element described above is used for a protection circuit.

FIG. 2 is a circuit diagram showing a protection circuit, and a protection circuit used for secondary batteries will be described by way of example.

A protection circuit 2 is connected in series to a secondary battery 1, and includes the switching element 3 and a control circuit 4.

The switching element 3 includes the first MOSFET 5 and the second MOSFET 6.

Note that, details of these MOSFETs are similar to those in the first embodiment and, therefore, their descriptions are omitted.

The first MOSFET 5 is connected in series to the secondary battery 1, forming a current path that allows a current to flow in the directions in which the secondary battery 1 charges and discharges and preventing the secondary battery 1 from being overcharged or overdischarged. That is, the two-way current path is formed in the first MOSFET 5 and two parasitic diodes are incorporated therein. Meanwhile, the second MOSFET 6 is connected to the drain 51 and back-gate 58 of the first MOSFET 5 and, when the first MOSFET 5 is turned off, prevents the operation of the parasitic diode conducting a current in the forward direction, which is selected from the two parasitic diodes 55 and 56 incorporated in the first MOSFET 5.

The source 52 side of the first MOSFET 5 is connected, for example, to the minus terminal (−) and the drain 51 side to the plus terminal (+). An AC adapter and loads are connected between the plus and minus terminals.

The control circuit 4 includes a charge/discharge control terminal 9 for controlling the ON/OFF state of the gate 54 of the first MOSFET 5 and the gate 64 of the second MOSFET 6. For charge and discharge operations, the control circuit 4 switches the first MOSFET 5 on, allowing a current to flow in the directions in which the secondary battery 1 charges and discharges.

In addition, the control circuit 4 determines, for example, whether or not a power source such as the AC adapter is connected between the plus and minus terminals in a state where the secondary battery 1 is in the overcharged state. If it is determined that a power source is connected between the plus and minus terminals then the first and second MOSFETs 5 and 6 are turned off to interrupt the current path, thereby preventing the secondary battery 1 from being overcharged.

The control circuit 4 further determines whether or not a load is connected between the plus and minus terminals in a state where the secondary battery 1 is in the overdischarged state. If it is determined that the load is connected between the plus and minus terminals then the first and second MOSFETs 5 and 6 are turned off to interrupt the current path, thereby preventing the secondary battery 1 from being overdischarged.

Such overcharged and overdischarged states can be controlled by causing the control circuit 4 to determine the potential of the minus terminal. This will be described later.

FIG. 3 is a cross-sectional schematic diagram showing the structure of the protection circuit.

The gates 54 and 64 respectively of the first and second MOSFETs 5 and 6 are controlled by the output of the charge/discharge control terminal 9. The turning on of the first and second MOSFETs 5 and 6 allows current conduction so that the secondary battery 1 is charged or discharged in one of the directions defined by the arrows, depending on the difference of the voltages applied to the plus and minus terminals. In addition, the parasitic diodes 55 and 56 incorporated in the first MOSFET 5 are interrupted as a result of turning the second MOSFET 6 off, whereby the current path is interrupted.

With reference to FIGS. 2 and 3, the operation of the protection circuit 2 will be described.

In a normal discharging, the load is connected to the plus and minus terminals, and the secondary battery 1 is then discharged to a predetermined potential. For example, this corresponds to operating on a portable communication device.

If the secondary battery 1 has sat in the overdischarged state, the current path needs to be interrupted in order to prevent further discharging of the secondary battery 1. In this case, it is assumed, for example, that the secondary battery 1 has a potential of 1V. Here the negative pole of the secondary battery 1 is assumed to have a potential of 0V.

The control circuit 4 determines the potential of the minus terminal, and if it has been determined that the minus terminal has a positive potential, it then determines that the load is connected to the plus and minus terminals in a state where the secondary battery 1 is in the overdischarged state. The control circuit 4 then turns off the first and second MOSFETs 5 and 6. By turning off the second MOSFET 6, the back-gate 58 of the first MOSFET 5 has a floating potential. Thus, the parasitic diodes 55 and 56 never operate. That is, the switching element 3 is turned off and thereby the current path is interrupted.

Meanwhile, when the secondary battery 1 that sits in this state (i.e., overdischarged state) is intended to be charged, a power source such as the AC adapter may be connected between the plus and minus terminals to allow a current to flow in the direction in which the secondary battery 1 charges. In this case, it is assumed, for example, that the plus terminal has a potential of 3V and that the minus terminal has a potential of −1V.

The control circuit 4 determines the potential of the minus terminal, and if it is determined that the minus terminal has a negative potential, it then determines that the AC adapter is connected between the plus and minus terminals in a state where the secondary battery 1 is in the overdischarged state. The control circuit 4 then turns on the first and second MOS-FETs 5 and 6. Thus, the switching element 3 is turned on and thereby a current is allowed to flow in the direction in which the secondary battery 1 charges, as indicated by the arrow.

In a normal charging, a power source such as the AC adapter is connected between the plus and minus terminals and thereby a charge current is provided in the direction as indicated by the arrow. Thus, the secondary battery 1 is charged.

If the secondary battery 1 has sat in the overcharged state, the current path needs to be interrupted. In this case, it is assumed, for example, that the plus terminal has a potential of 4V and that the minus terminal has a potential of −1V.

The control circuit 4 determines the potential of the minus terminal, and if it is determined that the minus terminal has a negative potential, it determines that the AC adapter is connected between the plus and minus terminals in a state where the secondary battery 1 is in the overcharged state. The control circuit 4 then turns off the first and second MOSFETs 5 and 6. Thus, the back-gate 58 of the first MOSFET 5 has a floating potential and thus the parasitic diodes 55 and 56 never operate. That is, the switching element 3 is turned off and thereby the current path is interrupted.

Meanwhile, when the secondary battery 1 that sits in this state (i.e., overcharged state) is intended to be discharged, the load may be connected to both terminals to allow a current to flow in the direction in which the secondary battery 1 discharges. In this case, it is assumed, for example, that the plus terminal has a potential of 4V and that the minus terminal has a potential of 1V.

The control circuit 4 determines the potential of the minus terminal, and if it has been determined that the minus terminal has a positive potential, it then determines that the load is connected to the plus and minus terminals in a state where the secondary battery 1 is in the overcharged state. The control circuit 4 then turns on the first and second MOSFETs 5 and 6. Thereby, a current flows in the direction in which the secondary battery 1 discharges, as indicated by the arrow.

The second MOSFET 6 stabilizes the potential of the back-gate 58 at the time when a current flows in the first MOSFET 5, and prevents the operations of the parasitic diodes 55 and 56 when the first MOSFET 5 is turned off. For this reason, there is not much need to consider reduction in the ON resistance of the second MOSFET 6 compared to that of the first MOSFET 5.

Thus, the size of the second MOSFET 6 can be sufficiently reduced compared to that of the first MOSFET 5, enabling the switching element 3 to be smaller than the chip size of the conventional two-way switching element 86.

In some cases, the protection circuit 2 performs control operations by detecting the resistance value (ON resistance) of the switching element 3. Therefore, it is sometimes desirable for the switching element 3 to have a design that allows it to maintain a predetermined ON resistance value. Specifically, when the conventional ON resistance is maintained, it is possible to reduce the chip size to about ¼, according to the second embodiment.

A detailed description thereof will be provided below. For example, the ON resistance and size of the conventional MOSFETs 82 and 83 are assumed to be 20 mΩ and 2 mm$^2$, respectively, which in turn means that the conventional two-way switching element 86 has an ON resistance of 40 mΩ and a chip size (occupied area) of 4 mm$^2$.

Meanwhile, the chip size of the switching element 3 can be reduced as small as 1 mm$^2$ in the second embodiment when the conventional ON resistance (40 mΩ) is maintained and the chip size of the second MOSFET 6 is sufficiently reduced. That is, the chip size of the switching element 3 can be reduced to about ¼.

Furthermore, the switching element 3 described above can operate with the one charge/discharge control terminal 9 provided to the control circuit 4. Thus, the switching element 3 requires a smaller number of control terminals than the conventional switching element 86 does.

It should be noted that although a lateral n-channel MOSFET is used for the MOSFETs 5 and 6 provided in the switching element 3 and the protection circuit 2, MOSFETs are not limited to this. A p-channel MOSFET may be used, and similar effects can also be obtained when a vertical MOSFET is used. In addition, the switching element 3 of the embodiment may be applicable as a line switch in a two-way switching system.

In addition, one of the first MOSFET 5 and the second MOSFET 6 may be a n-channel MOSFET and another of the two MOSFETs may be a p-channel MOSFET. In this configuration, the gates of the first MOSFET 5 and the second MOSFET 6 are connected to two control terminals of the switching element 3. Here, two different voltages are applied to the two control terminals, which are sufficient for the respective MOSFETs to turn on.

According to the embodiment of the present invention, one of the two parasitic diodes of the first switching element can be interrupted using the second switching element at the time when the switching element is turned off. That is, since an operating diode can be interrupted at the time when the switching element is turned off, it is only necessary to provide one MOSFET used for conducting or interrupting a current. For this reason, it is possible to reduce costs and to provide a switching element that has a reduced chip size. In addition, when the chip size of the switching element is not intended to be changed, the ON resistance can be reduced.

Moreover, the second switching element can apply a predetermined potential to the back-gate of the first switching element at the time when the first switching element is turned on. Thus, it is possible to stabilize the threshold voltage at the time when the first switching element operates.

Furthermore, adoption of the switching element described above to a protection circuit for secondary batteries and the like can significantly reduce the size of switching elements for preventing a secondary battery from being overcharged and overdischarged, thereby achieving reduced manufacturing costs.

In protection circuits, it is necessary to allow a current to flow both in the charge direction and in the discharge direction; this has been realized by two-way switching elements using two MOSFETs. According to the present embodiment, however, the parasitic diodes can be interrupted at the time when a MOSFET that conducts a current is turned off. For this reason, using one MOSFET, it is possible to realize two-way switching.

Furthermore, such a two-way switching element can be controlled by one control terminal and, therefore, protection circuits using the two-way switching element require a smaller number of control terminals than the conventional protection circuits do.

What is claimed is:

1. A switching device comprising:
   a first switching element comprising a control terminal, a first power terminal, a second power terminal, a back gate and a gate connected to the control terminal of the first switching element; and
   a second switching element comprising a control terminal, a first power terminal, a second power terminal, a back gate and a gate connected to the control terminal of the second switching element,
   wherein the first power terminal of the second switching element is connected to the first power terminal of the first switching element, the second power terminal of the second switching element is connected to the back gates of the first and second switching elements,
   neither the first power terminal of the first switching element nor the second power terminal of the first switching element is connected to the back gate of the first switching element, and
   the gate of the first switching element is connected to the gate of the second switching element.

2. The switching device of claim 1, wherein the second switching element is configured to turn on when the first switching element is turned on and to turn off when the first switching element is turned off.

3. The switching device of claim 2, wherein the first switching element comprises two parasitic diodes, and a connection to one of the parasitic diodes is interrupted when the first and second switching elements are turned off.

4. The switching device of claim 1, wherein a size of the second switching element is less than half a size of the first switching element.

5. A protection circuit for a secondary battery, comprising:
   a plus terminal and a minus terminal;
   a switching device comprising a first switching element and a second switching element, each of the switching elements comprising a control terminal, a first power terminal, a second power terminal, a back gate and a gate connected to the control terminal; and
   a control device controlling the first and second switching elements so that the secondary battery is charged and discharged between the plus and minus terminals,
   wherein the first switching element is connected to the secondary battery in series between the plus terminal and the minus terminal,
   the first power terminal of the second switching element is connected to the first power terminal of the first switching element, the second power terminal of the second switching element is connected to the back gates of the first and second switching elements,
   neither the first power terminal of the first switching element nor the second power terminal of the first switching element is connected to the back gate of the first switching element, and
   the gate of the first switching element is connected to the gate of the second switching element.

6. The protection circuit of claim 5, wherein the control device is configured to turn off the first and second switching elements when a voltage of the secondary battery is higher than a first predetermined value and the charging of the secondary battery continues, or when the voltage of the secondary battery is lower than a second predetermined value and the discharging of the secondary battery continues.

7. The protection circuit of claim 5, wherein the first switching element comprises two parasitic diodes, and a connection to one of the parasitic diodes is interrupted when the first and second switching elements are turned off in response to a signal applied to the control terminals by the control device.

8. The protection circuit of claim 5, wherein a size of the second switching element is less than half a size of the first switching element.

9. The protection circuit of claim 5, wherein the first switching element is configured to allow a current flow both in a direction for charging the secondary battery and in a direction for discharging the secondary battery.

* * * * *